United States Patent [19]

Shipley et al.

[11] 4,380,508

[45] Apr. 19, 1983

[54] ULTRA HIGH EFFICIENCY CATALYST FOR POLYMERIZING OLEFINS

[75] Inventors: Randall S. Shipley, Alvin; Donald F. Birkelbach, Angleton, both of Tex.

[73] Assignee: The Dow Chemical Company, Midland, Mich.

[21] Appl. No.: 313,903

[22] Filed: Oct. 22, 1981

[51] Int. Cl.$^3$ .................................................. C08F 4/64
[52] U.S. Cl. ............................ 252/431 C; 252/429 B; 252/431 R; 526/125; 526/132; 526/134; 526/138; 526/142
[58] Field of Search ............ 252/429 B, 431 R, 431 C

[56] References Cited

U.S. PATENT DOCUMENTS

| | | | |
|---|---|---|---|
| 3,070,549 | 12/1962 | Xiegler et al. | 252/429 |
| 3,257,332 | 6/1966 | Ziegler et al. | 252/429 |
| 3,412,174 | 11/1968 | Kroll | 252/429 B X |
| 3,489,731 | 1/1970 | Imoto et al. | 260/80.78 |
| 3,520,826 | 7/1970 | Tanaka et al. | 252/429 |
| 3,678,025 | 7/1972 | Birrell | 260/94.9 E |
| 3,687,910 | 8/1972 | Jones | 260/80.78 |
| 3,989,878 | 11/1976 | Aishima | 526/116 |
| 4,006,101 | 2/1977 | Matsurra et al. | 252/429 |
| 4,018,707 | 4/1977 | Wyatt | 252/430 |
| 4,067,822 | 1/1978 | Gessell et al. | 252/429 |
| 4,091,082 | 5/1978 | Gessell et al. | 423/413 |
| 4,104,198 | 8/1978 | May, Jr. et al. | 252/429 B |
| 4,109,071 | 8/1978 | Berger et al. | 526/114 |
| 4,120,820 | 10/1978 | Birkelbach | 252/429 B |
| 4,163,831 | 8/1979 | Gessell | 526/153 |
| 4,172,050 | 10/1979 | Gessell | 252/431 R |
| 4,213,880 | 7/1980 | Knight et al. | 252/431 R |
| 4,244,838 | 1/1981 | Gessell | 252/429 B |
| 4,245,071 | 1/1981 | Kondo et al. | 526/114 |
| 4,246,383 | 1/1981 | Gessell | 526/92 |
| 4,314,912 | 2/1982 | Lowery et al. | 252/429 B |

FOREIGN PATENT DOCUMENTS

| | | |
|---|---|---|
| 2758312 | 7/1978 | Fed. Rep. of Germany . |
| 51-111281 | 10/1976 | Japan . |
| 51-148785 | 12/1976 | Japan . |
| 52-98076 | 8/1977 | Japan . |
| 1235062 | 6/1971 | United Kingdom . |
| 1305610 | 2/1973 | United Kingdom . |
| 1352901 | 5/1974 | United Kingdom . |
| 1492379 | 11/1977 | United Kingdom . |
| 1493159 | 11/1977 | United Kingdom . |
| 1500873 | 2/1978 | United Kingdom . |
| 1502567 | 3/1978 | United Kingdom . |

OTHER PUBLICATIONS

L. Petkov, R. Dyrtcheva, Ph. Radenkov and D. Dobreva, Organometallics in ethylene polymerization with a catalyst system, $TiCl_4/Al(C_2H_5)_2Cl/Mg(C_6H_5)_2$:1, Suspension polymerization process.

*Primary Examiner*—Patrick Garvin
*Attorney, Agent, or Firm*—J. G. Carter

[57] ABSTRACT

Compositions consisting of the reaction product or complex resulting from the mixing of (1) a mixture of a transition metal compound such as a tetraalkoxy titanium compound with a non-metallic oxygen-containing compound such as an alcohol and (2) a strongly reducing alkylating agent such as a dialkyl magnesium compound are useful in the preparation of catalysts for polymerizing α-olefins at ultra-high efficiencies at high polymerization temperatures.

17 Claims, No Drawings

ULTRA HIGH EFFICIENCY CATALYST FOR POLYMERIZING OLEFINS

BACKGROUND OF THE INVENTION

This invention relates to precursors for and to new catalyst compositions useful for initiating and promoting polymerization of α-olefins and to a polymerization process employing such catalyst compositions.

It is well known that olefins such as ethylene, propylene and 1-butene, in the presence of metallic catalysts, particularly the reaction products of organometallic compounds and transition metal compounds, can be polymerized to form substantially unbranched polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. No. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirable high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aformentioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of such catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. No. 3,392,159, U.S. Pat. No. 3,737,393, West German patent application No. 2,231,982 and British Pat. Nos. 1,305,610 and 1,358,437. While the increased efficiencies achieved by using these recent catalysts are significant, even higher efficiencies are desirable, particularly in copolymerization processes.

More recently, e.g. British Pat. No. 1,492,379, high efficiency catalysts have been employed which permit polymerization temperatures above 140° C. Such high polymerization temperatures provide for reduced energy requirements in solution polymerization processes in that the closer the polymerization temperature is to the boiling point of the polymerization solvent, the less energy is required in removing the solvent.

Even more recently, e.g. U.S. Pat. No. 4,250,286 and U.S. Pat. No. 4,269,733, the preparation of a catalyst for polymerizing olefins has been disclosed in which the catalyst contains the product resulting from the admixture of a transition metal compound and a zinc compound.

In copending applications Ser. No. 313,868 filed Oct. 22, 1981 and 313,867 filed Oct. 22, 1981 we have disclosed a similar catalyst system for the polymerization of olefins in which the catalyst contains the product resulting from the admixture of a transition metal compound and a strongly reducing metal alkyl such as trialkyl aluminum or dialkyl magnesium.

We have now discovered that such catalyst can be improved if the transition metal compound is first mixed with an oxygen-containing material before addition of the strongly reducing metal alkyl compound. The catalysts subsequently prepared therefrom have higher initial rates of reaction and higher efficiencies than do those catalysts prepared without the oxygen-containing material.

SUMMARY OF THE INVENTION

The present invention in one aspect is a transition metal-containing component suitable for use in the preparation of olefin polymerization catalysts which is the reaction product or complex formed by mixing at a temperature and for a time sufficient to provide a color change (1) the reaction product or complex formed by mixing
  (a) a transition metal compound having at least one hydrocarbyloxy group attached to said transition metal and
  (b) a non-metallic oxygen-containing component; with
(2) a reducing alkylating agent containing a metal wherein the atomic ratio of the metal contained in component (2) to transition metal (Tm) is from about 0.1:1 to about 5:1, preferably from about 0.2:1 to about 3:1 and most preferably from about 0.25:1 to about 2:1; and the oxygen-containing component is employed in quantities so as to provide an atomic ratio of O(oxygen):Tm of from about 0.1:1 to about 4:1, preferably from about 0.2:1 to about 3:1 and most preferably from about 0.4:1 to about 2:1.

Another aspect of the present invention are catalysts for polymerizing α-olefins which comprise the catalytic reaction product of
  (A) the aforementioned reaction product or complex;
  (B) a magnesium halide resulting from the reaction of
    (a) an organomagnesium component and (b) a halide source; and
  (C) an organoaluminum compound, if required.

The components are employed in quantities which provide the composition with atomic ratios of the elements as follows:

Mg:Tm is from about 1:1 to about 200:1, preferably from about 2:1 to about 100:1, most preferably from about 5:1 to about 75:1.

Al:Tm is from about 0.1:1 to about 200:1, preferably from about 0.5:1 to about 100:1 and most preferably from about 1:1 to about 75:1.

Excess X:Al is from about 0.0005:1 to about 5:1, preferably from about 0.002:1 to about 2:1 and most preferably from about 0.01:1 to about 1.4:1.

Excess X is the amount of halide above that amount which is theoretically required to convert the organomagnesium component to magnesium dihalide.

DETAILED DESCRIPTION OF THE INVENTION

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under relatively low temperature and pressure (as compared to classical high pressure free radical techniques), although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octane-1, dodecene-1, octadecene-1, 1,7-octadiene, 1,4-hexadiene, mixtures thereof and the like. It is understood that α-olefins may be copolymerized with other α-olefins and/or with small amounts, i.e., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene with up to 50, especially from about 0.1 to about 40, weight percent of propylene, butene-1, hexene-1, octene-1, 4-methylpentene-1, 1,7-octadiene, 1,4-hexadiene or similar α-olefin or diolefin based on total monomer.

Suitable reducing alkylating agents which can be employed in the present invention include one or more of those represented by the empirical formula $M'R_{a-b}X_b$ wherein M' is a metal selected from the group consisting of Al, B, Mg, or Li; X is a halogen, preferably chlorine or bromine; each R is independently an alkyl group having from 1 to about 20 carbon atoms, preferably from about 1 to about 10 carbon atoms and most preferably from about 1 to about 4 carbon atoms; a has a value equal to the valance of metal M' and b has a value of from zero to the value of a minus one (a minus 1).

Suitable aluminum compounds which can be employed herein as a reducing alkylating agent include one or more of those represented by the empirical formulae $R_3Al$, $R_2AlX$ or $RAlX_2$, wherein R and X are as hereinbefore defined. Particularly suitable aluminum compounds include triethyl aluminum, trimethyl aluminum, diethylaluminum chloride, ethylaluminum dichloride, mixtures thereof and the like.

Suitable magnesium compounds which can be employed herein as a reducing alkylating agent include one or more of those represented by the empirical formulae $R_2Mg$ or $RMgX$, wherein R and X are as hereinbefore defined. Particularly suitable compounds include, for example, butyl ethyl magnesium, n-butyl sec-butyl magnesium, di-n-hexyl magnesium, ethyl magnesium chloride, mixtures thereof and the like.

Suitable boron compounds which can be employed herein as a reducing alkylating agent include one or more of those represented by the empirical formulae $BR_3$, $BR_2X$ or $BRX_2$ wherein R and X are as hereinbefore defined. Particularly suitable compounds include, for example, triethyl boron and ethyl boron dichloride, mixtures thereof and the like.

Suitable lithium compounds which can be employed herein as a reducing alkylating agent include one or more of those represented by the empirical formula LiR wherein R and X are as hereinbefore defined. Particularly suitable compounds include, for example, n-butyl lithium, sec-butyl lithium, mixtures thereof and the like.

Suitable non-metallic oxygen-containing compounds which can be employed herein include, for example, molecular oxygen, air, alcohols, ketones, aldehydes, carboxylic acids, esters of carboxylic acids, peroxides, water and the like. Those compounds which are soluble in hydrocarbon solvent are especially preferred.

Particularly suitable alcohols include, for example, methanol, ethanol, n-butanol, sec-butanol, mixtures thereof and the like.

Particularly suitable ketones which can be employed herein include, for example, acetone, methyl ethyl ketone, methyl isobutyl ketone, mixtures thereof and the like.

Particularly suitable carboxylic acids which can be employed herein include, for example, formic acid, acetic acid, stearic acid, mixtures thereof and the like.

Particularly suitable esters of carboxylic acids which can be employed herein include, for example ethyl acetate, methyl formate, ethyl oxalate, mixtures thereof and the like.

Particularly suitable ethers which can be employed include, for example, diethyl ether, ethyl vinyl ether, mixtures thereof and the like.

Particularly suitable aldehydes which can be employed herein include, for example, formaldehyde, acetaldehyde, propionaldehyde, mixtures thereof and the like.

Particularly suitable peroxides which can be employed herein include, for example, hydrogen peroxide, t-butylperoxide, mixtures thereof and the like.

Suitable transition metal compounds which can be employed in the present invention include those represented by the empirical formulae $Tm(OR)_yX_{x-y}$, $Tm(OR)_{x-2}O$ or $TmOX_{x-2}$, wherein Tm is a transition metal selected from groups IVB, VB or VIB; each R is independently a hydrocarbyl group, preferably alkyl or aryl, having from 1 to 20, preferably from 1 to about 10, carbon atoms; each X is independently a halogen, preferably chlorine or bromine; x has a value equal to the valence of Tm and y has a value from 1 to the valence of Tm.

Particularly suitable transition metal compounds include, for example, tetraethoxy titanium, tetraisopropoxy titanium, tetra-n-butoxy titanium, di-n-butoxy titanium dichloride, tetraphenoxy titanium, tetra-n-propoxy titanium, tetra-(2-ethylhexoxy) titanium, tri-n-butoxy vanadium oxide, oxyvanadium trichloride, tri-isopropoxy vanadium oxide, zirconium tetra-n-butoxide, zirconium tetra-n-propoxide, zirconium tetra-isopropoxide, mixtures thereof and the like.

Suitable organomagnesium components which can be employed in the present invention include those represented by the empirical formula a MgR''$_2$·xMR''$_y$ wherein each R'' is independently hydrocarbyl or hydrocarbyloxy, M is aluminum, zinc or mixtures thereof and x is about zero to about 10, preferably zero to about 5, most preferably from about zero to about 2.5, and y denotes the number of hydrocarbyl and/or hydrocarbyloxy groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkoxy having 1 to 10 carbon atoms being preferred. Hydrocarbyl is preferred over hydrocarbyloxy.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the empirical formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the empirical formula MR$_{y-a}$X$_a$ wherein M is a metal of Groups IIIA or IVA, of Mendeleev's Periodic Table of Elements, R is a monovalent organic radical, X is a halogen, y has a value corresponding to the valence of M, and a has a value from 1 to y. A suitable metallic halide is SnCl$_4$, although the preferred metallic halides are aluminum halides of the empirical formula AlR$_{3-a}$X$_a$ wherein each R is independently hydrocarbyl as hereinbefore defined such as alkyl, X is a halogen, and a is a number from 1 to 3. Most preferred are alkyl-aluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In preparing the reaction product or complex of the present invention, the transition metal component and oxygen-containing component are mixed together in a suitable inert solvent or diluent followed by the addition of the alkylating agent in a quantity and under suitable conditions so as to effect a color change in the reaction mixture. Suitable conditions include temperatures of from about −50° C. to about 110° C., preferably from about 0° C. to about 30° C. At lower temperatures, longer times may be required to effect a color change.

The reaction time is also affected by the concentration of the reactants, e.g. low concentrations require longer times at any given temperature than do higher concentrations. The solvents which can be employed include those suitable for preparing the catalysts of this invention with the hydrocarbon solvents being most suitable.

Sufficient quantities of the alkylating agent should be employed when preparing the reaction complex so as to provide the desired color change but less than any such quantity which would result in substantial reduction of the transition metal component.

The color change which occurs upon addition of the essentially non-reducing alkylating agent varies depending upon the particular components employed, i.e., the particular oxygen-containing compound and/or the particular alkylating agent.

The magnesium halide can be preformed from the organomagnesium compound and the halide source or it can be prepared in situ in which instance the catalyst is prepared by mixing in a suitable solvent (1) the organomagnesium component, (2) the halide source and (3) the reaction product or complex formed by mixing (a) a mixture of (i) said transition metal component and (ii) said oxygen-containing component and (b) said alkylating agent.

The foregoing catalyst components are combined in proportions sufficient to provide atomic ratios as previously mentioned.

In cases wherein neither the organomagnesium component, the halide source nor the alkylating agent contains aluminum or contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 200:1, preferably from 0.5:1 to about 100:1. However, when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 75:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10, carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoin catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In order to maximize catalyst efficiency, the catalyst is prepared by mixing the components of the catalyst in an inert liquid diluent in the following order: organomagnesium compound, halide source, the aluminum compound if required, and the reaction product or complex formed from said transition metal compound, oxygen-containing compound and alkylating agent.

In the polymerization process employing the aforementioned catalytic reaction product, polymerization is effected by adding a catalytic amount of the above catalyst composition to a polymerization zone containing at least one α-olefin monomer, or vice versa. The polymerization zone is maintained at temperatures in the range from about 0° to about 300° C. preferably at solution polymerization temperatures, e.g., from about 130° to about 250° C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the sollvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue.

The following examples are given to illustrate the invention, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248.

EXAMPLES 1-8 AND COMPARATIVE EXPERIMENTS A-D

A. Preparation of the Titanium Complexes

All titanium.alcohol.reducing alkylating agent complexes were prepared by simple admixture of the neat tetraisopropyl titanate (TiPT) with the neat n-butanol (n-BuOH), followed by addition of a 15% solution of the reducing alkylating agent in ISOPAR ® E (an isoparaffinic hydrocarbon fraction havig a boiling range of 116° C.-134° C.). After development of a color change (generally within ~30 minutes if at all), the mixture was diluted to give an overall titanium concentration of 0.025 molar. The complexes were then used in catalyst preparations. The components and color of the complexes are given in the following Table I.

TABLE I

| EXAMPLE OR COMP. EXPT. NO. | MOLE RATIO OF TiPT/nBuOH/ METAL ALKYL | COLOR OF COMPLEX |
|---|---|---|
| C.E. A | 1/0/0.25[1] | Dark green with solids |
| Ex. 1 | 1/0.5/0.25[1] | Green with solids |
| Ex. 2 | 1/1/0.25[1] | Lt. green with solids |
| C.E. B | 1/5/0.25[1] | Pale green with solids |
| C.E. C | 1/0/0.5[2] | Green |
| Ex. 3 | 1/0.5/0.5[2] | Green |
| Ex. 4 | 1/1/0.5[2] | Lt. green |
| Ex. 5 | 1/2/0.5[2] | Clear |

TABLE I-continued

| EXAMPLE OR COMP. EXPT. NO. | MOLE RATIO OF TiPT/nBuOH/ METAL ALKYL | COLOR OF COMPLEX |
|---|---|---|
| C.E. D | 1/0/1 | Lt. brown |
| Ex. 6 | 1/0.5/1 | Clear |
| Ex. 7 | 1/1/1 | Clear |
| Ex. 8 | 1/2/1 | Clear |

[1] n-butyl-sec-butyl magnesium
[2] triethyl aluminum
[3] ethyl aluminum chloride

B. Preparation of the Catalyst

In a 4-oz., narrow mouth catalyst bottle under an inert atmosphere was mixed the following components in the following order:

| | |
|---|---|
| 97.80 ml | of ISOPAR ® E |
| 0.85 ml | of 0.703 M n-butyl-sec-butyl magnesium |
| 0.75 ml | of 1.00 M ethyl aluminum dichloride |
| 0.60 ml | of 0.025 M titanium complex |
| 100.00 ml | |

C. Polymerization

Into a stirred one-gallon batch reactor was added 2 liters of ISOPAR ® E, 4 psig of hydrogen, 175 psig of ethylene, and 10 ml (0.0015 mmole Ti) of the previous described catalysts. Total pressure was kept constant at 200 psig using ethylene (the solvent vapor pressure being 21 psig) and the reactor temperature was controlled at 150° C. Because of the high initial activities of these catalysts, an initial exotherm is produced, the size of which is dependent on catalyst activity (the higher the exotherm, the higher the initial catalyst activity). This exotherm can be controlled to some extent by cooling the reactor with large volumes of air blown past the reactor. Total reaction time was 30 minutes. Catalyst efficiencies and exotherms are listed in Table II. The example and comparative experiment numbers correspond to those in Table 1, for the various complexes prepared.

Each example shows an improvement in the catalyst as evidenced by increased catalyst activity (increased exotherm) and increased catalyst efficiency. The amount of improvement in highly dependent on the amount of O-containing compound or metal alkyl used. Generally, an optimum level of O-compound and metal alkyl is found, above or below which catalyst efficiencies are not optimized. Too high a level of O-compound (C.E. B) or metal alkyl may lead to lower catalyst efficiencies than if neither compound were used.

TABLE II

| EXAMPLE OR COMP. EXPT. NO. | EXOTHERM TEMP. °C. | CATALYST EFFICIENCY #PE/#Ti |
|---|---|---|
| C.E. A | 18 | $2.297 \times 10^6$ |
| Ex. 1 | 20 | $2.298 \times 10^6$ |
| Ex. 2 | 19 | $2.439 \times 10^6$ |
| C.E. B | 18 | $2.182 \times 10^6$ |
| C.E. C | 18 | $2.210 \times 10^6$ |
| Ex. 3 | 23 | $2.305 \times 10^6$ |
| Ex. 4 | 24 | $2.495 \times 10^6$ |
| Ex. 5 | 19 | $2.223 \times 10^6$ |
| C.E. D | 17 | $1.966 \times 10^6$ |
| Ex. 6 | 18 | $2.419 \times 10^6$ |
| Ex. 7 | 18 | $2.151 \times 10^6$ |

TABLE II-continued

| EXAMPLE OR COMP. EXPT. NO. | EXOTHERM TEMP. °C. | CATALYST EFFICIENCY #PE/#Ti |
|---|---|---|
| Ex. 8 | 21 | $2.184 \times 10^6$ |

We clam:

1. A reaction product or complex formed from an admixture of
   (a) a reaction product or complex formed from a mixture of
      (i) at least one transition metal compound represented by the empirical formulae $Tm(OR)_yX_{x-y}$, $TmOX_{x-2}$ or $Tm(OR)_{x-2}O$ wherein Tm is a transition metal selected from groups IVB, VB or VIB; each R is independently a hydrocarbyl group having from 1 to about 20 carbon atoms; each X is independently a halogen; x has a value equal to the valence of Tm and y has a value from 1 to the valence of Tm; and
      (ii) at least one non-metallic oxygen-containing compound selected from the group consisting of molecular oxygen, air, alcohols, ketones, aldehydes, carboxylic acids, esters of carboxylic acids, peroxides, water and mixtures thereof; and wherein said mixture of (i) and (ii) is subjected to a temperature of from about $-50°$ C. to about $110°$ C. for a time sufficient to effect a color change; and
   (b) a reducing alkylating agent represented by the empirical formula $M'R_{a-b}X_b$ wherein M' is a metal selected from the group consisting of Al, Li, Mg or B; X is a halogen, preferably chlorine or bromine; each R is independently an alkyl group having from 1 to about 20 carbon atoms; a has a value equal to the valence of the metal M' and b has a value of from zero up to the valence of the metal M' minus 1; and wherein components (a) and (b) are mixed in proportions such that the atomic ratio of M':Tm is from about 0.1:1 to about 5:1 and the atomic ratio of O:Tm is from about 0.1:1 to about 4:1.

2. A reaction product or complex of claim 1 wherein in component (a) Tm is titanium, each R is independently a hydrocarbyl group having from 2 to about 10 carbon atoms and X is chlorine or bromine; and said oxygen-containing component is an alcohol; in component (b), M' is Al, R is a hydrocarbyl group having from 1 to about 10 carbon atoms; the M':Ti atomic ratio is from about 0.2:1 to about 3:1; and the O:Ti atomic ratio is from about 0.2:1 to about 3:1.

3. A reaction product or complex of claim 1 wherein in component (a) R is a saturated aliphatic hydrocarbyl group and the M':Ti ratio is from about 0.25:1 to about 2:1; and the O:Ti atomic ratio is from about 0.4:1 to about 2:1.

4. A reaction product or complex of claims 1, 2, or 3 wherein component (a-i) is titanium tetraethoxide, titanium tetra-n-propoxide, titanium tetra-isopropoxide, titanium tetra-n-butoxide, titanium tetra-(2-ethylhexoxide) or mixture thereof; component (a-ii) is n-butanol, sec-butanol, n-propanol, isopropanol, water, acetone or mixture thereof; and component (b) is triethyl aluminum, ethyl aluminum dichloride, diethylaluminum chloride, triethyl boron, butyl ethyl magnesium, or mixture thereof.

5. A catalytic reaction product of
   (A) a reaction product or complex formed from the admixture of
      (1) the reaction product or complex formed by mixing
         (a) at least one transition metal compound represented by the empirical formulae $Tm(OR)_yX_{x-y}$, $TmOX_{x-2}$ or $Tm(OR)_{x-2}O$ wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and
         (b) at least one oxygen-containing compound selected from the group consisting of molecular oxygen, air, alcohols, ketones, aldehydes, carboxylic acids, esters of carboxylic acids, peroxides, water and mixtures thereof; and wherein said mixture of (i) and (ii) is subjected to a temperature of from about $-50°$ C. to about $110°$ C. for a time sufficient to effect a color change; and
      (2) at least one reducing alkylating agent represented by the empirical formula $M'R_{a-b}X_b$ wherein M' is a metal selected from the group consisting of Al, B, Mg or Li; X is a halogen, preferably chlorine or bromine; each R is independently an alkyl group having from 1 to about 20 carbon atoms; a has a value equal to the valence of metal M' and b has a value of from zero up to the valence of the metal M' minus 1;
   (B) a magnesium halide resulting from the reaction of
      (1) an organomagnesium compound represented by the empirical formula $MgR''_2 \cdot xMR''_y$ wherein M is aluminum or zinc, each R'' is independently a hydrocarbyl or hydrocarbyloxy group having from 1 to about 20 carbon atoms, x has a value from zero to 10 and y has a value corresponding to the valence of M; with
      (2) a halide source selected from
         (a) an active non-metallic halide, said non-metallic halide corresponding to the empirical formula R'X wherein R' is hydrogen or a hydrocarbyl group such that the hydrocarbyl halide is at least as active as sec-butyl chloride and does not poison the catalyst and X is halogen or
         (b) a metallic halide corresponding to the empirical formula $MR_{y-a}X_a$ wherein M is a metal of Group IIIA or IVA of Mendeleev's Periodic Table of Elements, R is a monovalent hydrocarbyl radical, X is halogen, y is a number corresponding to the valence of M and a is a number of 1 to y; and
   (C) when the organomagnesium component and/or the halide source provides insufficient quantities of aluminum, an aluminum compound is added which is represented by the empirical formula $AlR_{y'}X_{y''}$ wherein R and X are as defined above and y' and y'' each have a value of from zero to three with the sum of y' and y'' being three; and
wherein the components are employed in quantities which provide an atomic ratio of the elements Mg:Tm of from about 1:1 to about 200:1; M':Tm of from about 0.1:1 to about 5:1; O:Tm of from about 0.1:1 to about 4:1; Al:Tm of from about 0.1:1 to about 200:1 and an excess X:Al of from about 0.0005:1 to about 5:1.

6. A catalytic reaction product of claim 5 wherein (a) in component (A-1), Tm is titanium, each R is independently a hydrocarbyl group having from 1 to about 10 carbon atoms and X is chlorine or bromine and said oxygen-containing component is an alcohol;

(b) in component (A-2), M' is Al, R is a hydrocarbyl group having from 1 to about 10 carbon atoms;

(c) in component (B-1), M is aluminum and R" is a hydrocarbyl group having from 1 to about 10 carbon atoms and x has a value of from about zero to about 5;

(d) in component (B-2-A), R' is hydrogen or a tertiary butyl group and X is chlorine;

(e) in component (B-2-b), M is a metal from Groups IIIA or IVA, y-a is zero, 1 or 2 and X is chlorine;

(f) in component (C), the aluminum compound is a trialkyl aluminum compound wherein the alkyl groups independently have from 1 to about 10 carbon atoms; and (g) the components are employed in quantities so as to provide atomic ratios of Mg:Ti of from about 2:1 to about 100:1; M':Ti from about 0.2:1 to about 3:1; O:Ti of from about 0.2:1 to about 3:1; Al:Ti of from about 0.5:1 to about 100:1 and excess X:Al of from about 0.002:1 to about 2:1.

7. A catalytic reaction product of claim 6 wherein
(a) in component (A-1), R is a saturated aliphatic hydrocarbyl group;
(b) in component (B-1), x has a value of from about 0.15 to about 2.5; and
(c) the components are employed in quantities so as to provide atomic ratios of Mg:Ti of from about 5:1 to about 75:1; M':Ti of from about 0.25:1 to about 2:1; Al:Ti of from about 1:1 to about 75:1; O:Ti of from about 0.5:1 to about 2:1; Al:Ti of from about 1:1 to about 75:1 and excess X:Al of from about 0.01:1 to about 1.4:1.

8. A catalytic reaction product of claim 7 wherein
(a) component (A-1-a) is titanium tetraethoxide, titanium tetra-n-propoxide, titanium tetra-isopropoxide, titanium tetra-n-butoxide, titanium tetra-(2-ethylhexoxide) or a mixture thereof;
(b) component (A-1-b) is n-butanol, sec-butanol, n-propanol, isopropanol, water, acetone or a mixture thereof;
(c) component (A-2) is triethylaluminum, ethylaluminum dichloride, diethylaluminum chloride, triethyl boron, butyl ethyl magnesium or a mixture thereof;
(d) component (B-1) is a dialkyl magnesium compound wherein the alkyl groups independently have from 1 to about 10 carbon atoms; and
(e) component (B-2) is substantially anhydrous hydrogen chloride, ethyl aluminum dichloride or tin tetrachloride.

9. A catalytic reaction product of claims 5, 6, 7 or 8 wherein the components are added in the order (B-1), (B-2), (C) if employed and (A).

10. A catalytic reaction product of claims 5, 6, 7 or 8 wherein the components are added in the order (B-1), (B-2), (A) and (C) if employed, and provided that the halide source, (B-2), is not a tin compound.

11. A catalytic reaction product of claims 5, 6, 7 or 8 wherein the components are added in the order (B-2), (C) if employed, (B-1) and (A).

12. In a catalyst composition comprising a magnesium halide, a transition metal compound and a reducing alkylating compound, said composition having an atomic or molar ratio of the elements Mg:Tm of from about 1:1 to about 200:1; reducing alkylating compound:Tm of from about 0.1:1 to about 5:1; Al:Tm of from about 0.1:1 to about 200:1 and an excess X:Al of from about 0.0005:1 to about 5:1; the improvement which comprises forming a reaction product or complex of (1) a mixture of (i) the transition metal compound and (ii) a oxygen-containing compound selected from the group consisting of molecular oxygen, air, alcohols, ketones, aldehydes, carboxylic acids, esters of carboxylic acids, peroxides, water and mixtures thereof; and wherein said mixture of (i) and (ii) is subjected to a temperature of from about $-50°$ C. to about $110°$ C. for a time sufficient to effect a color change; and in quantities so as to provide an atomic ratio of O:Tm of from about 0.1:1 to about 4:1; and (2) the reducing alkylating compound prior to preparation of the catalyst therefrom.

13. A catalyst composition of claim 12 wherein the atomic ratios of the elements are Mg:Tm of from about 2:1 to about 100:1; reducing alkylating compound:Tm of from about 0.2:1 to about 3:1; O:Tm of from about 0.2:1 to about 3:1; Al:Tm of from about 0.5:1 to about 100:1 and excess X:Al of from about 0.002:1 to about 2:1.

14. A catalyst composition of claim 13 wherein the atomic ratios of the elements are Mg:Tm of from about 5:1 to about 75:1; reducing alkylating compound:Tm of from about 0.25:1 to about 2:1; O:Tm of from about 0.4:1 to about 2:1; Al:Tm of from about 1:1 to about 75:1 and excess X:Al of from about 0.01:1 to about 1.4:1.

15. A catalyst composition of claims 12, 13 or 14 wherein said reducing alkylating compound is represented by the empirical formula $AlR_{3-x}X_x$ wherein R is a hydrocarbyl group having from 1 to about 10 carbon atoms, X is a halogen and x has a value of zero, 1 or 2.

16. A catalytic reaction product of claims 12, 13 or 14 wherein said transition metal compound is a titanium compound.

17. A catalytic reaction product of claim 16 wherein
(a) said titanium compound is titanium tetraethoxide, titanium tetra-n-propoxide, titanium tetra-n-butoxide, titanium tetra-(2-ethylhexoxide) or a mixture thereof;
(b) said oxygen-containing compound is n-butanol, sec-butanol, n-propanol, isopropanol, water, acetone or a mixture thereof; and
(c) said reducing alkylating compound is triethylaluminum, ethylaluminum dichloride, diethylaluminum chloride, triethyl boron, butyl ethyl magnesium or a mixture thereof.

* * * * *

UNITED STATES PATENT AND TRADEMARK OFFICE
CERTIFICATE OF CORRECTION

PATENT NO. : 4,380,508
DATED : April 19, 1983
INVENTOR(S) : Randall S. Shipley and Donald F. Birkelbach It is certified that error appears in the above—identified patent and that said Letters Patent is hereby corrected as shown below:

Col. 11, Claim 1, line 6; "$Tm(OR)_v X_{x-y}$" should read --$Tm(OR)_y X_{x-y}$--.

Col. 13, line 3; "Xis" should read --X is--.

Col. 13, line 12; "(B-2-A)" should read --(B-2-a)--.

Col. 14, line 16; "a" should read --an--.

Signed and Sealed this

Twentieth Day of December 1983

[SEAL]

Attest:

GERALD J. MOSSINGHOFF

Attesting Officer

Commissioner of Patents and Trademarks